(12) United States Patent
Coady

(10) Patent No.: US 7,780,027 B2
(45) Date of Patent: Aug. 24, 2010

(54) AXIALLY STACKED DOUBLE BARREL ANIMAL FEEDER SYSTEM

(76) Inventor: Michael Coady, 251 Windy La., Rockwall, TX (US) 75087

( * ) Notice: Subject to any disclaimer, the term of this patent is extended or adjusted under 35 U.S.C. 154(b) by 766 days.

(21) Appl. No.: 11/703,268

(22) Filed: Feb. 8, 2007

(65) Prior Publication Data

US 2008/0190370 A1 Aug. 14, 2008

(51) Int. Cl.
*A47G 19/00* (2006.01)
*A01K 1/10* (2006.01)
*F16L 21/00* (2006.01)

(52) U.S. Cl. .................. 220/23.86; 119/51.03; 285/398
(58) Field of Classification Search ............. 220/23.86; 119/151.03, 51.11, 55, 57.6; 285/398
See application file for complete search history.

(56) References Cited

U.S. PATENT DOCUMENTS

| | | | |
|---|---|---|---|
| 4,236,736 A * | 12/1980 | Anderson ................ | 285/125.1 |
| 4,945,859 A | 8/1990 | Churchwell | |
| 5,143,022 A | 9/1992 | Fore | |
| 5,862,777 A * | 1/1999 | Sweeney ................ | 119/57.91 |
| 6,841,374 B1 | 11/2002 | Lillig | |
| 6,557,598 B2 | 5/2003 | Glover | |
| 6,622,653 B1 * | 9/2003 | Starnes, Jr. ............. | 119/51.01 |
| 6,684,812 B1 * | 2/2004 | Tucker ................... | 119/57.91 |
| 6,814,029 B1 | 11/2004 | Chesser | |
| 6,990,925 B2 | 1/2006 | Banks | |
| 2005/0229860 A1 * | 10/2005 | Meritt ...................... | 119/53 |

* cited by examiner

*Primary Examiner*—Anthony Stashick
*Assistant Examiner*—Shawn M Braden

(57) ABSTRACT

A wildlife feeder system is disclosed comprised of a first barrel having an open top and an open bottom, a second barrel having an open top and a substantially closed bottom (having orifices as necessary to dispense feed), said barrels being, for example, 30, 55 or 85 gallon steel barrels, the first barrel being axially coupled to the second barrel, the open tops of each barrel being conjoined, a lid adapted to cover the open bottom of the first barrel and rotatable lid handle mechanism adapted to couple the lid proximate the open bottom of the first barrel, a platform and leg support assembly adapted to be coupled circumferentially to the second barrel proximate the longitudinal center thereof, a ladder adapted to be coupled to the platform and leg support assembly, a plurality of removable legs adapted to be coupled to the platform and leg support assembly and a barrel coupling assembly comprising an inner ring (made of plastic or metal) and an outer ring clamp.

2 Claims, 5 Drawing Sheets

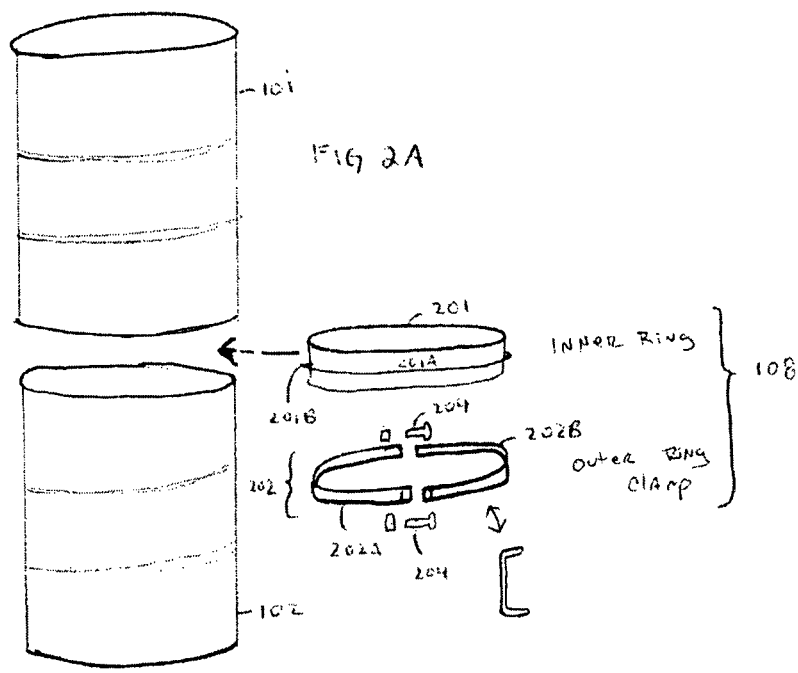

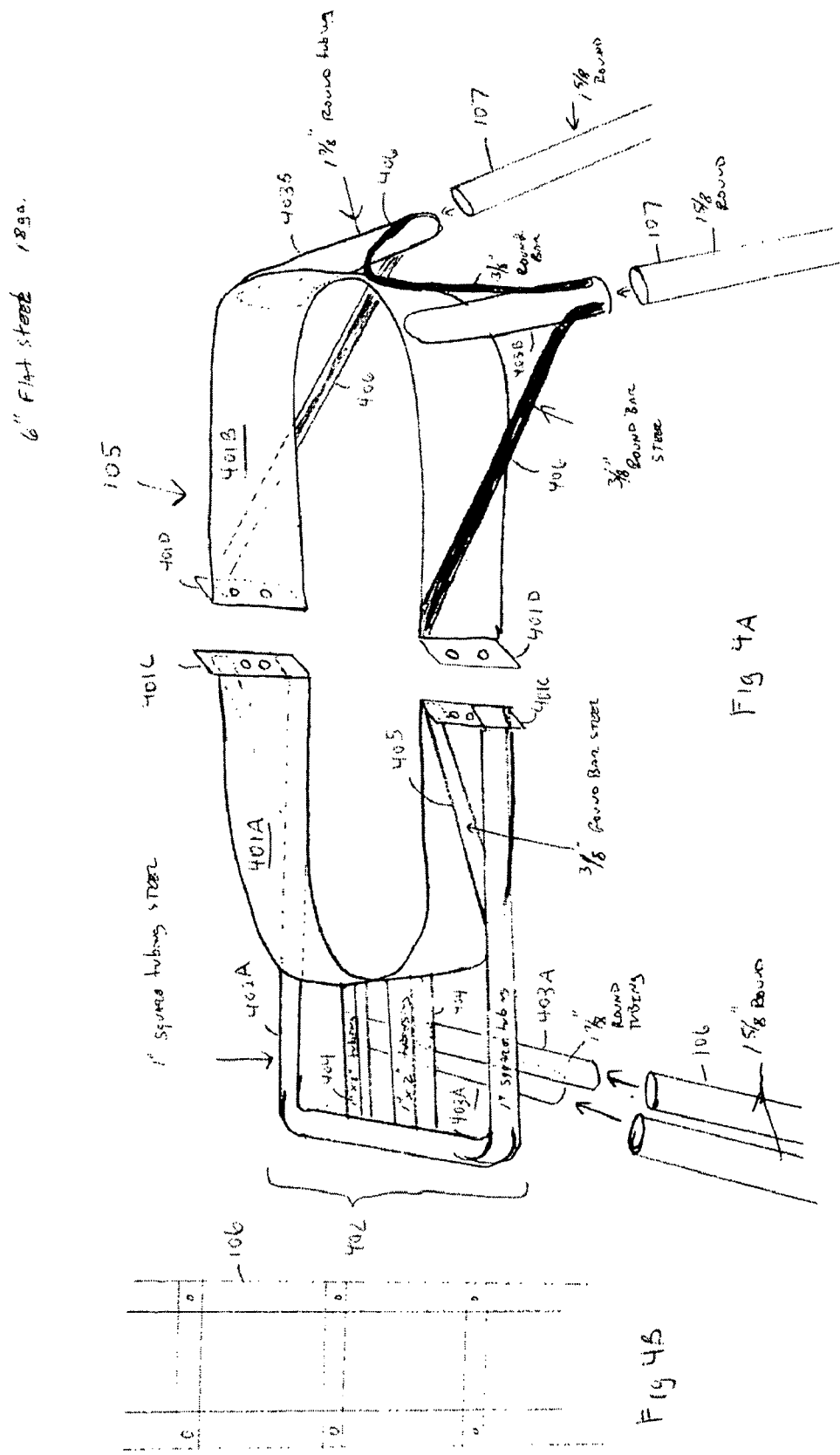

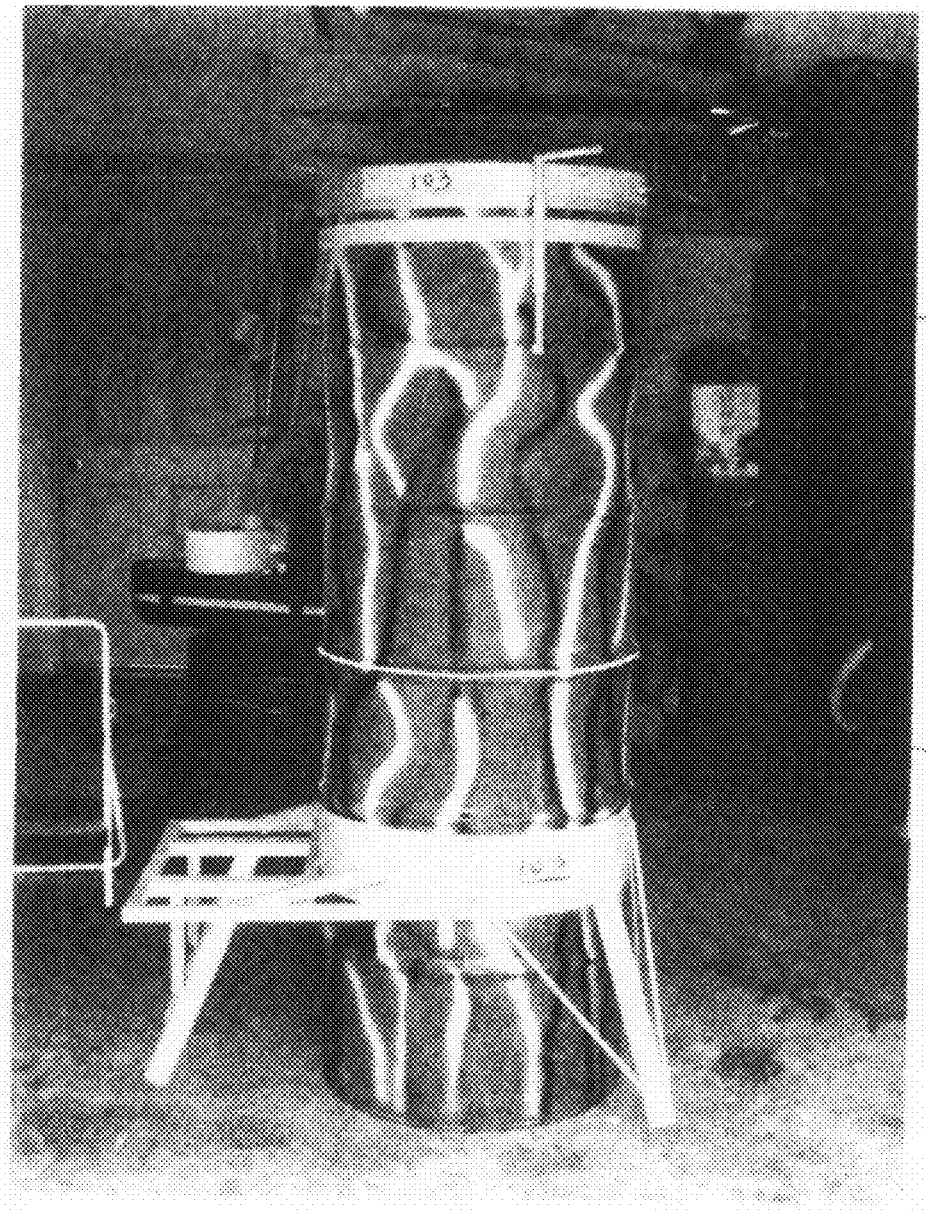

AXIALLY STACKED DOUBLE BARREL ANIMAL FEEDER SYSTEM

TECHNICAL FIELD

This invention relates to wildlife and large animal feeder devices.

BACKGROUND OF THE INVENTION

It is a conventional practice of hunters and wildlife observers to set out feeder devices to attract animals, such as deer, onto their property. Over the years, a variety of feeders have been developed which are intended to feed a quantity of feed to the ground or to holders that are accessible to animals. Some of these feeders are gravity fed, others are wind powered or powered by small electric devices to provide feed over time.

While conventional feeders are somewhat effective, they have a number of disadvantages. For example, they typically hold, at most, 55 gallons of feed in a single barrel, which may require frequent reloading. Further, such feeders are often difficult and inconvenient to load. Therefore, a need exists for an improved feeder system and apparatus which is adapted to hold up to 110 gallons of feed, is easily accessible for reloading and is able to keep feed dry.

SUMMARY OF THE INVENTION

The present invention is a wildlife feeder system and apparatus comprised of a first barrel having an open top and an open bottom, a second barrel having an open top and a substantially closed bottom (having only those orifices necessary to dispense feed directly or through a feed dispensing mechanism), said barrels each being a set of, for example, 30 gallon steel barrels, 55 gallon steel barrels or 85 gallon steel barrels, the first barrel being axially coupled to the second barrel, the open tops of each barrel being conjoined, a lid adapted to cover the open bottom of the first barrel (which, is located at the upper part of the assembled feeder system) and rotatable lid handle mechanism adapted to couple the lid proximate the open bottom of the first barrel, a platform and leg support assembly adapted to be coupled circumferentially to the second barrel proximate the longitudinal center thereof, a ladder adapted to be coupled to the platform and leg support assembly, a plurality of removable legs adapted to be coupled to the platform and leg support assembly and a barrel coupling assembly comprising an inner ring (made of plastic or metal) and an outer ring clamp. In an additional embodiment, a feed delivery mechanism can be coupled to the substantially closed end of the second barrel.

A feed port is located on the bottom portion of the second barrel. Said first barrel and second barrel may be standard drums made of galvanized, powder-coated or painted steel. The lid can be galvanized steel or a plastic lid that is adapted to be rotatably connected to the bottom of first barrel (which, is located at the upper part of the assembled feeder system) so as to keep feed dry and fresh. The legs can be comprised of heavy duty powder-coated, galvanized or painted steel with foot pads. The present invention is designed to feed straight minerals, corn, wildlife protein and commercial and privately available wildlife feeds.

To those skilled in the art to which this invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

BRIEF DESCRIPTION OF THE DRAWINGS

For a better understanding of the present invention including the features, advantages and specific embodiments, reference is made to the following detailed description along with accompanying drawings in which:

FIG. 2A is an exploded view of the first barrel and second barrel and barrel coupling assembly of the present invention;

FIG. 2B is a view of the outer ring of the barrel coupling assembly of the present invention;

FIG. 2C is a cut-away side view of the barrel coupling assembly of the present invention;

FIG. 4A is a view of the platform and leg support assembly of the present invention;

FIG. 4B is a view of the ladder which is attachable to the platform and leg support assembly of the present invention; and FIG. 5 is a further view of the stacked double barrel feeder system of the present invention without attached legs.

References in the detailed description correspond to like references in the Figures unless otherwise noted. Like numerals refer to like parts throughout the various Figures.

DETAILED DESCRIPTION OF A PREFERRED EMBODIMENT

While the making and using of a preferred embodiment of the present invention is discussed in detail below, it should be appreciated that the present invention provides many applicable inventive concepts which can be embodied in a wide variety of specific contexts. Some features of the preferred embodiment shown and discussed may be simplified or exaggerated for illustrating the principles of the invention.

Figure 1:
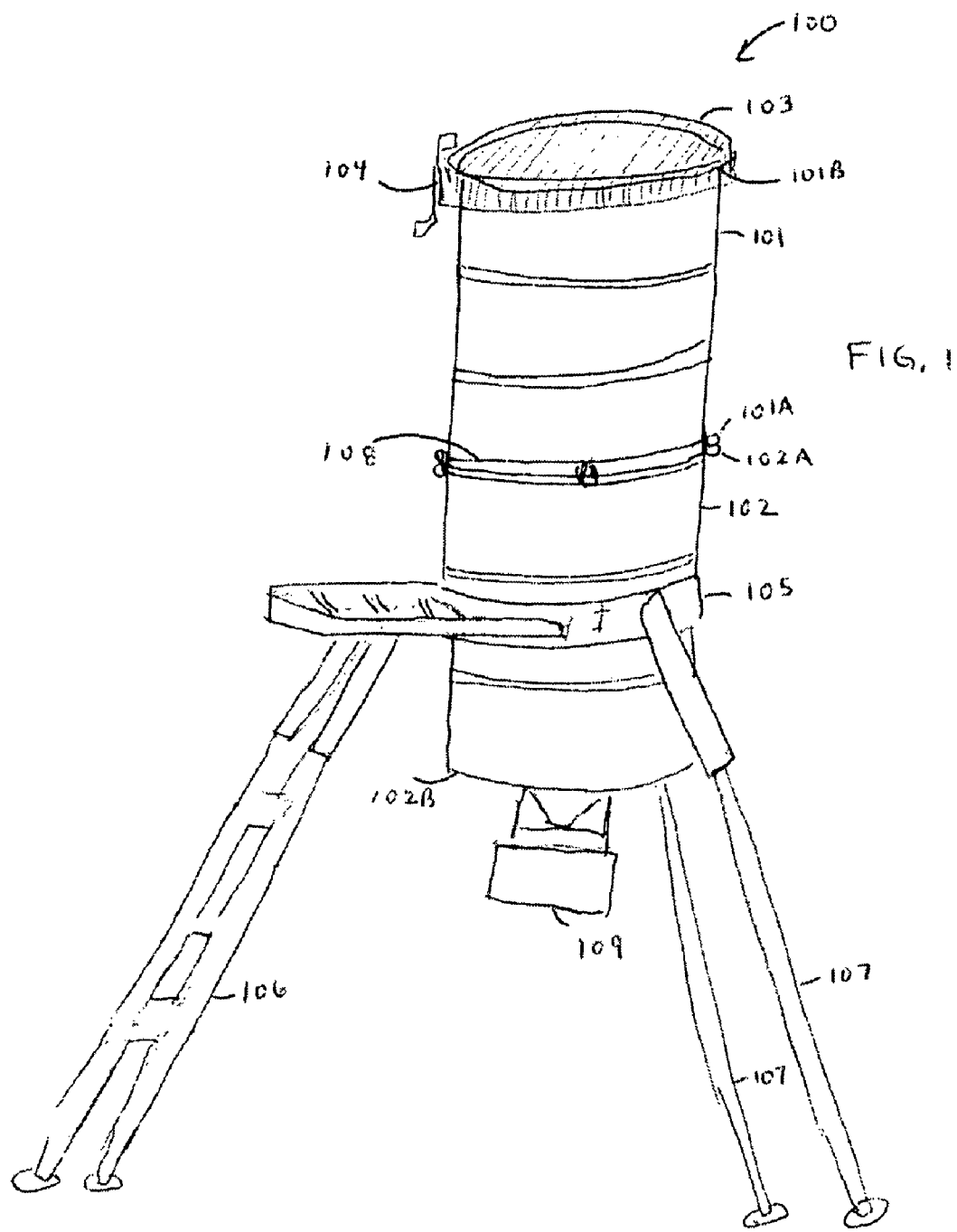
FIG. 1 is a side view of a stacked double barrel feeder system of the present invention.

Referring now to FIG. 1, a side view of a stacked double barrel feeder system 100 of the present invention is provided. As seen therein, the present invention is comprised of a first barrel 101 having a cylindrical shape and having an open top and an open bottom, a second barrel 102 having a cylindrical shape and having an open top and a substantially closed bottom (having just those feed orifices necessary to dispense feed), said barrels each being a set of, for example, 30 gallon steel barrels or drums, 55 gallon steel barrels or drums, or 85 gallon steel barrels or drums. Said first barrel 101 and said second barrel 102 are each in the form of a substantially circular right cylinder each having a top edge 101A, 102A and bottom edge 101B, 102B. The top edge 101A, 102A of each barrel has a lip around the circumference thereof. The first barrel 101 is inverted and the open top thereof placed axially on the open top of the second barrel 102, the top edge 101A of the first barrel 101 being aligned with the top edge 102A of the second barrel 102. A lid 103 is adapted to cover the open bottom of the first barrel 101 and rotatable lid handle mechanism 104 adapted to couple the lid 103 proximate the open bottom of first barrel 101. A platform and leg support assembly 105 is adapted to be coupled circumferentially to the second barrel proximate the longitudinal center thereof with a ladder 106 adapted to be coupled to the platform and leg support assembly 105. A plurality of removable legs 107 are adapted to be coupled to the platform and leg support assembly 105. As described in more detail below, a barrel coupling assembly 108 comprising an inner ring (made of plastic or metal) and an outer ring clamp coupled to the top edge of the first barrel 101 and the top edge of the second barrel 102. In an additional embodiment, a feed delivery mechanism 109 can be coupled to the substantially closed bottom of the second barrel 102.

Referring now to FIG. 2A, an exploded view of the first barrel 101 and second barrel 102 and barrel coupling assembly 108 of the present invention is provided. As seen therein, barrel coupling assembly 108 comprises an inner ring 201 (made of plastic or metal) and an outer ring clamp 202. Inner ring 201 comprises a circular ring 201A having a flat portion 201B extending orthogonally from the surface therein, having a diameter slightly less than the diameter of the first barrel 101 and second barrel 102 and adapted to be placed within the interior portion of the top of first barrel 101 and the top of the second barrel 102. Outer ring clamp 202 comprises a pair of semi-circular portions 202A and 202B each being formed as a circular channel 203 and a pair of coupling mechanisms, such as bolts 204, adapted to couple said semi-circular portions 202A and 202B. Alternatively, the outer ring clamp 202 can have a single coupling means on one portion of the ring, with a hinged portion adapted to open up such outer ring clamp 202 located about 180 degrees from the single coupling means.

FIG. 2B is another view of the outer ring of the barrel coupling assembly of the present invention illustrating the pair of semi-circular portions 202A and 202B and a pair of coupling mechanisms, such as bolts 204, adapted to couple said semi-circular portions 202A and 202B.

FIG. 2C is a cut-away side view of the barrel coupling assembly of the present invention illustrating the placement of the inner ring 201 and the outer ring clamp 202 in relation to the first barrel 101 and second barrel 102. As seen therein, the inner ring fits just within the interior of the first barrel 101 and the second barrel 102, with the flat portion 201B extending orthogonally from the surface of the inner ring 201 separating the top edge 101A of first barrel 101 from top edge 102A of second barrel 102. The channel shape of the outer ring clamp 202 is adapted to fit over the lip of the first barrel 101 and the lip of the second barrel 102, and when coupled with bolts or other coupling mechanism, is adapted to form a seal that is substantially impervious to moisture, pests and the like. A sealer, such as a bead of silicon, weather stripping or caulk is placed between the lip of each such barrel and the flat portion 201B of the inner ring.

Figure 3B:
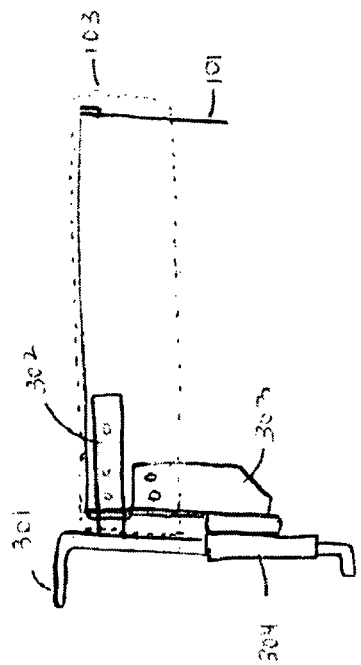
FIG. 3B is a second view of the lid and rotatable lid handle mechanism of the present invention.
Figure 3A:
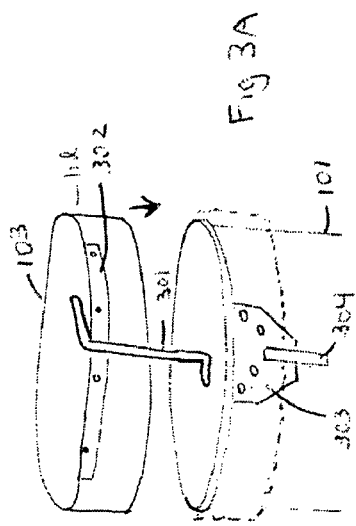
FIG. 3A is a first view of the lid and rotatable lid handle mechanism of the present invention.

FIG. 3A is a first view of the lid 103 and rotatable lid handle mechanism 104 of the present invention. Lid 103 is in the form of a closed end circular cylinder having a diameter slightly larger than that of first barrel 101 over which it fits. Rotatable lid handle mechanism includes rod handle 301, a lid attachment 302, a barrel attachment 303 and a rod ferrule 304, through which rod handle 301 is inserted. Lid attachment 302 and barrel attachment 303 each have a plurality of apertures through which coupling mechanisms, such as bolts, can be used to attach said mechanisms to first barrel 101. Alternatively, said lid attachment and/or barrel attachment can be coupled directly to the side of first barrel 101, for example, using industrial adhesives or welds.

FIG. 3B is a second view of the lid and rotatable lid handle mechanism of the present invention. As seen therein, rod handle 301 is inserted into rod ferrule 304 and is adapted to move freely therein. Rod handle 301 is further fixably coupled to lid attachment 303 using a coupling mechanism, such as an industrial adhesive, weld, or bracket. The top portion of rod handle 301 can be bent at a 90 degree or similar angle to provide an means of grasping the handle to pull the lid 103 off of the first barrel 101 and rotate it to the side so as to allow the loading of feed or other material into the stacked double barrels of the present invention. The bottom portion of rod handle 301 can be bent at a 90 degree or similar angle so as to provide a stop mechanism so as to limit the angle through which the lid 103 can swing so that a portion of the edge of the lid 103 comes to rest on some part of the bottom edge 101B of the first barrel 101 when the lid is removed to allow the deposition of feed or other material into the axially stacked double barrel feeder of the present invention.

Figure 3C:
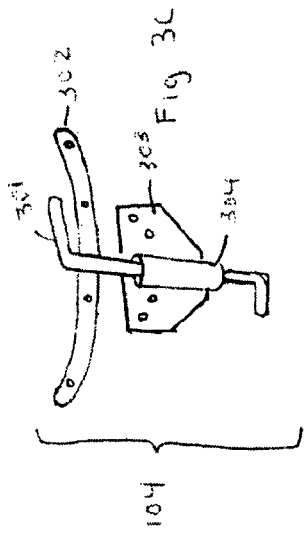
FIG. 3C is a view of the rod and bracket portion of the lid and rotatable lid handle mechanism of the present invention.

FIG. 3C is another view of the rod and bracket portion of the lid and able lid handle mechanism of the present invention, indicating the location of the attachment of the lid attachment 303 to the first barrel 101 and the barrel attachment 303. As seen therein, bolts are used as the coupling means of the barrel attachment 303 to the first barrel 101. When lid 103 is placed over the first barrel 101, the lid 103 has a height that is sufficient to cover the bolts. This assists in preventing moisture from entering into the axially stacked double barrel feeder of the present invention. The length of the rod can be any length necessary to allow the lid 103 to clear the first barrel 101 when the rod handle 301 is raised then pivoted into an open position.

FIG. 4A is a view of the platform and leg support assembly 105 of the present invention. The platform and leg support assembly 105 is adapted to be coupled circumferentially to the second barrel 102 proximate the longitudinal center thereof with ladder 106 adapted to be coupled to the platform and leg support assembly 105. A plurality of removable legs 107 are adapted to be coupled to the platform and leg support assembly 105 using a plurality of leg receiving members 403A, 403B adapted to receive the ladder 106 and removable legs 107, by having a diameter either less than or more than the ladder 106 and legs 107. For example, the leg receiving members 403A, 403B can be comprised of 1⅞ inch round tubing and the ladder 106 and legs 107 comprised of 1⅝ inch round tubing. The platform and leg support assembly 105 is comprised of two flat steel members 401A and 401B, approximately 6 inches wide, each formed into a half circle, with the ends 401C, 401D thereof bent outward at approximately a 90 degree angle so as to mate the two flat steel members 401A and 401B together. On the first flat steel member 401A is attached a platform 402 from which leg receiving members 403A adapted to receive ladder 106 are attached. Additional leg receiving members 403B adapted to receive legs 107 are coupled to the second flat steel member 401B. Platform 402 is, for example, comprised of a U-shaped square tubing 402A coupled to the sides of the flat steel member 401A with a plurality of tubing members 404 coupled to flat steel member 401A and U-shaped square tubing 402A. Said U-shaped square tubing 402A can comprise 1 inch steel square tubing and have side lengths of approximately 18-36 inches and a width approximately equal to the diameter of the second barrel 102. The plurality of tubing members 404 can comprise 1"×2" tubing having an approximate length of 12-18 inches. Said members are coupled using welds, bolts or similar appropriate coupling means. A first set of supporting rods 405 are coupled between the U-shaped steel tubing 402A and flat steel member 401A. The first set of supporting rods can comprise, among other things, ⅜ inch round bar steel. A second set of supporting rods 406 are coupled between flat steel member 401B and leg receiving members 403B. The second set of supporting rods 406 can comprise ⅜ inch round bar and can be welded to the flat steel member 401A. A wire mesh or plywood member can be cut to fit within the platform to allow a person to stand on the platform. Flat steel members 401A, 401B are placed around second barrel 102 and coupled together using a coupling means such as bolts on each side, or alternatively, one side can be hinged and the other side coupled using bolts. Second barrel 102 has a plurality of ridges around the circumference thereof extending from the outer surface topology of the cylinder causing intermittent localized bell shaped increases in the diameter of the second barrel. Flat steel members 401A and 401B, when coupled, have a diameter slightly larger than the diameter of second barrel 102, but less than the diameter of said rigid ridges so that the coupled flat steel members 401A, 401B do not slide up the feeder when the legs are supporting it off the ground.

FIG. 4B is a view of the ladder which is attachable to the platform and leg support assembly of the present invention. The length of the ladder 106 is preferably between 6 and 9 feet in length. The height of the legs 107 are preferably between 6 and 9 feet in length. In operation, the ladder is adapted to allow a person to reach the platform 402. The user can then stand on platform 402, remove lid 103, and easily fill the feeder.

A feed port located on the bottom portion of the second barrel 102. Said first barrel 101 and second barrel 102 may be standard 30, 55 or 85 gallon barrels or drums made of, for example, galvanized steel, powder-coated steel or painted steel. The lid 103 can be galvanized steel or a plastic lid that is adapted to be rotatably connected to the bottom of first barrel 101 so as to keep feed dry and fresh. The legs 107 can be comprised of heavy duty steel legs (powder coated, galvanized or painted) with foot pads. The present invention is designed to feed straight minerals, corn or mixture.

The embodiments shown and described above are only exemplary. Even though numerous characteristics and advantages of the present invention have been set forth in the foregoing description together with details of the invention, the disclosure is illustrative only and changes may be made within the principles of the invention to the full extent indicated by the broad general meaning of the terms used in the attached claims.

What is claimed is:

1. A wildlife feeder apparatus comprising:
   a first barrel having a cylindrical shape and having an open top and an open bottom;
   a second barrel having a cylindrical shape and having an open top and a substantially closed bottom;
   said first barrel and said second barrel having a top edge and a bottom edge, each such edge having a lip around the circumference thereof;
   a barrel coupling assembly;
   the first barrel being inverted and the open top thereof placed axially on the open top of the second barrel, the top edge of the first barrel being aligned with the top edge of the second barrel and being coupled to said first barrel using said barrel coupling assembly;
   a lid adapted to cover the open bottom of the first barrel;
   a rotatable lid handle mechanism adapted to couple the lid proximate the open bottom of said first barrel;
   a platform and leg support assembly adapted to be coupled circumferentially to the second barrel proximate the longitudinal center thereof;
   a ladder adapted to be coupled to the platform and leg support assembly; and
   a plurality of removable legs adapted to be coupled to the platform and leg support assembly, wherein the platform and leg support assembly is comprised of two flat steel members, each about 6 inches wide, each formed into a half circle, with the ends thereof bent outward at approximately a 90 degree angle so as to mate the two flat steel members;
   a platform having a mesh or plywood floor and being formed on the first flat steel member from which leg receiving members adapted to receive the ladder is attached; and
   additional leg receiving members adapted to receive legs being coupled to the second flat steel member.

2. The wildlife feeder apparatus of claim 1, wherein said platform is comprised of a U-shaped square tubing member being coupled to the sides of the first flat steel member with a plurality of tubing members coupled to flat steel member and U-shaped square tubing member.

* * * * *